US007801155B2

(12) United States Patent
Wang

(10) Patent No.: US 7,801,155 B2
(45) Date of Patent: Sep. 21, 2010

(54) RESOURCE ALLOCATION IN VIRTUAL ROUTERS

(75) Inventor: Yang Wang, Vienna, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1616 days.

(21) Appl. No.: 10/084,917

(22) Filed: Mar. 1, 2002

(65) Prior Publication Data

US 2003/0169747 A1 Sep. 11, 2003

(51) Int. Cl.
*H04L 12/28* (2006.01)

(52) U.S. Cl. ...................................... 370/400; 370/392

(58) Field of Classification Search ................. 370/351, 370/352, 356, 389, 392, 400, 401, 468; 709/238, 709/242

See application file for complete search history.

(56) References Cited

U.S. PATENT DOCUMENTS 6,609,153 B1 * 8/2003 Salkewicz .................. 709/223
6,687,220 B1 * 2/2004 Ayres ........................ 370/229
2002/0062344 A1 * 5/2002 Ylonen et al. .............. 709/204
2002/0099849 A1 * 7/2002 Alfieri et al. ............... 709/243
2002/0198974 A1 * 12/2002 Shafer ........................ 709/223
2003/0051048 A1 * 3/2003 Watson et al. .............. 709/238
2003/0210686 A1 * 11/2003 Terrell et al. ............... 370/389
2004/0260825 A1 * 12/2004 Agarwal et al. ............ 709/230

* cited by examiner

*Primary Examiner*—Pankaj Kumar
*Assistant Examiner*—Saba Tsegaye

(57) ABSTRACT

A router system implements a plurality of virtual routers. Various combinations of resources may be shared by the router system when implementing the virtual routers. In one embodiment, the particular combination of resources to share when implementing the virtual router is user programmable.

9 Claims, 15 Drawing Sheets

200
270 N
261 262 263
N N N
Customer Network 251
Customer Network 252
POP 214
POP 216
264 N
265 N
N 269
POP 212
NETWORK 210
POP 218
POP 222
POP 220
SA 230
N 268
Customer Network 253
N 267
N 266

NETWORK(s)

INTERFACE
520
522
524
526
528
530
Ports
Mem
Proc
515
Fabric Switch
ROUTING ENGINE
510
MEMORY 514
PROCESSOR 512
ROUTER SYSTEM 300

RESOURCE ALLOCATION IN VIRTUAL ROUTERS

BACKGROUND OF THE INVENTION

A. Field of the Invention

The present invention relates generally to network data routing and, more particularly, to high performance network routing systems.

B. Description of Related Art

Routers are devices that direct traffic flow through networks. In particular, routers receive data packets, determine the next network point to which the packets should be forwarded, and then transmit the packets to the determined next network point.

In general, routers can be classified into a number of categories based on their traffic handling capacity or logical function. Backbone routers, for example, are high-performance routers that are typically implemented at the endpoints of high-capacity network links. In the context of the Internet, for example, backbone routers may be implemented at connection points of high-capacity optical links. Regional routers, in contrast, may be implemented as mid-range routers, having a routing capacity at a level below the backbone routers. Edge routers are lower capacity routers than the regional routers and are usually implemented at edges of an Internet Service Provider (ISP). The edge router controls packet transfer from the customer network or with other networks of the ISP. Edge routers are sometimes referred to as boundary routers. In general, the backbone, regional, and edge routers together provide traffic aggregation and management.

FIG. 1 is a diagram illustrating the inter-connection of a number of routers in a network. Backbone routers 110 interface with a network backbone, such as an optical backbone of the Internet. Backbone routers 110 may connect to regional routers 120. Regional routers 120 further connect to edge routers 130. Backbone routers 110, regional routers 120, and edge routers 130 may together implement a point-of-presence (POP) 100 for a network, such as the Internet. Each router within POP 100 has a unique address, such as a unique Internet Protocol (IP) address.

POPs are frequently owned by Internet Service Providers (ISPs) and are used to provide network access to the customers of the ISP. One disadvantage in the configuration of POP 100 is that the routers of POP 100 use a number of ports to communicate with one another. For example, as illustrated, each of backbone routers 110 uses two ports, one for each communication line shown in FIG. 1, to communicate with regional routers 120. Similarly, regional routers 120 use two ports to communicate with backbone routers 110.

Routers may use line cards to physically implement data transmission/reception at ports of the routers. Line cards, however, can be relatively expensive components. Accordingly, interconnecting routers 110, 120, and 130 at POP 100 can be a relatively expensive endeavor.

Accordingly, there is a need in the art to more efficiently implement the functionality of multiple routers within a single ISP or POP.

SUMMARY OF THE INVENTION

Systems and methods consistent with the principles of this invention address this and other needs by providing a router system that includes multiple virtual routers that share resources.

One aspect of the present invention is directed to a routing system that includes a number of routing resources. Additionally, a group of virtual routers are implemented by sharing selected ones of the routing resources of the routing system.

A second aspect of the invention is directed to a network POP. The POP includes a physical router system having a group of resources. Additionally, the POP includes at least one backbone router implemented as a virtual router by the physical router system and at least one regional router implemented as a virtual router by the physical router system. The backbone virtual router and the regional virtual router share resources of the physical router system.

A third aspect consistent with the invention is directed to a method that includes allocating a first set of resources as shared resources and allocating a second set of resources as non-shared resources. Further, the method includes implementing a group of virtual routers based on a sharing of resources from the first set of resources between the virtual routers and based on independently assigning resources of the second set of resources to the virtual router.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

A router system, as described herein, includes a number of logically separated "virtual" routers that may perform the functions of traditional backbone routers, regional routers, and/or edge routers. The virtual routers of a single physical router may appear to the outside world as a number of traditional physical routers. The single physical router, in implementing the virtual routers, shares physical and logical resources that would traditionally be independently implemented by each of the virtual routers. The manner in which the physical and logical resources are shared may be a user programmable feature of the router.

EXEMPLARY SYSTEM

Figure 2:
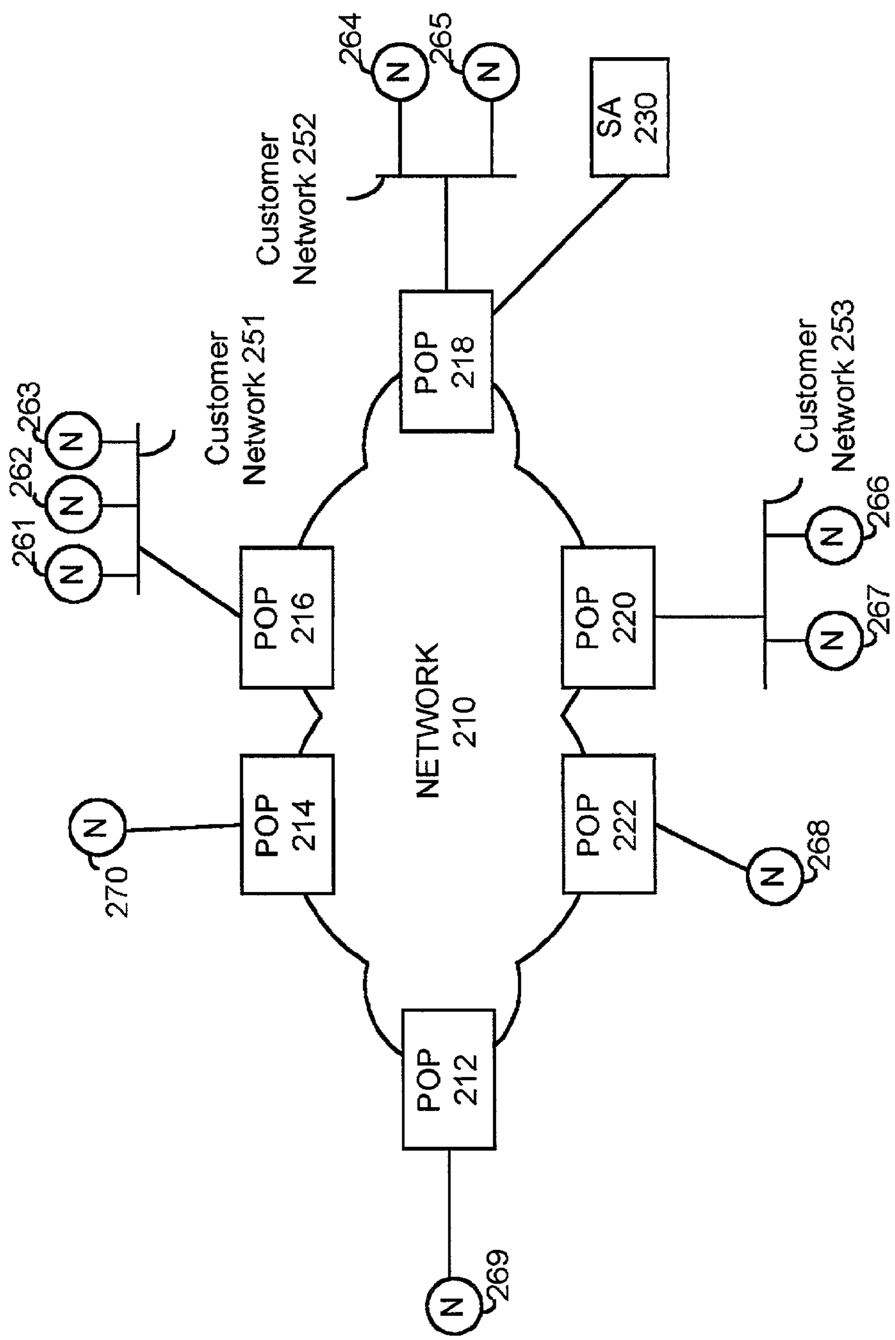
FIG. 2 illustrates an exemplary network in which systems and methods, consistent with the present invention, may be implemented.

FIG. 2 illustrates an exemplary system 200 in which systems and methods, consistent with the present invention, may be implemented. In FIG. 2, system 200 includes a network 210, points of presence (POPs) 212-222, a system administrator (SA) device 230, and a group of nodes 261-270 that may be directly connected to a POP 212-222 or connected via a customer network 251-253.

System 200 may include, for example, the Internet, an intranet, a local area network (LAN), a metropolitan area network (MAN), a wide area network (WAN), or the like. In fact, system 200 may include any type of network or combination of networks that permits routing of information from a particular source to a particular destination.

The POPs 212-222 may include a number of routers that decide, based on routing protocols (e.g., Interior Gateway Protocol and/or Exterior Gateway Protocol) and routing tables, how and where to send packets of information. Each POP 212-222 may also include one or more servers, such as an e-mail server or a World Wide Web server. Each POP 212-222 may be implemented via hardware and/or software. Consistent with aspects of the invention, and as will be described in more detail below, POPs 212-222 may be implemented using a router system that includes a number of virtual routers.

The SA device 230 may include any type of computer system, such as a mainframe, minicomputer, or personal computer, capable of connecting to the network 210 to communicate with other devices, such as a POPs 212-222, in the system 200. The SA device 230 may connect to a POP, such as POP 218, via a wired, wireless, or optical connection.

The customer networks 251-253 may include any type of local network, such as a LAN, MAN, WAN, or the like, that permits routing of information packets among the nodes connected to the respective network. These local networks may connect to edge routers of POPs 212-222 through special routers called customer premise equipments (CPEs). The nodes 261-270 may include computers, such as workstations and servers, or any other type of device that has a network interface card (NIC), such as a printer or modem. Moreover, the nodes 261-270 may include devices, such as a personal digital assistant, that connect to a particular local network via a wireless connection.

The number of components illustrated in FIG. 2 is provided for simplicity. In practice, a typical system 200 may include a larger or smaller number of networks, POPs, SA devices, customer networks, and/or nodes.

VIRTUAL ROUTER

Figure 1:
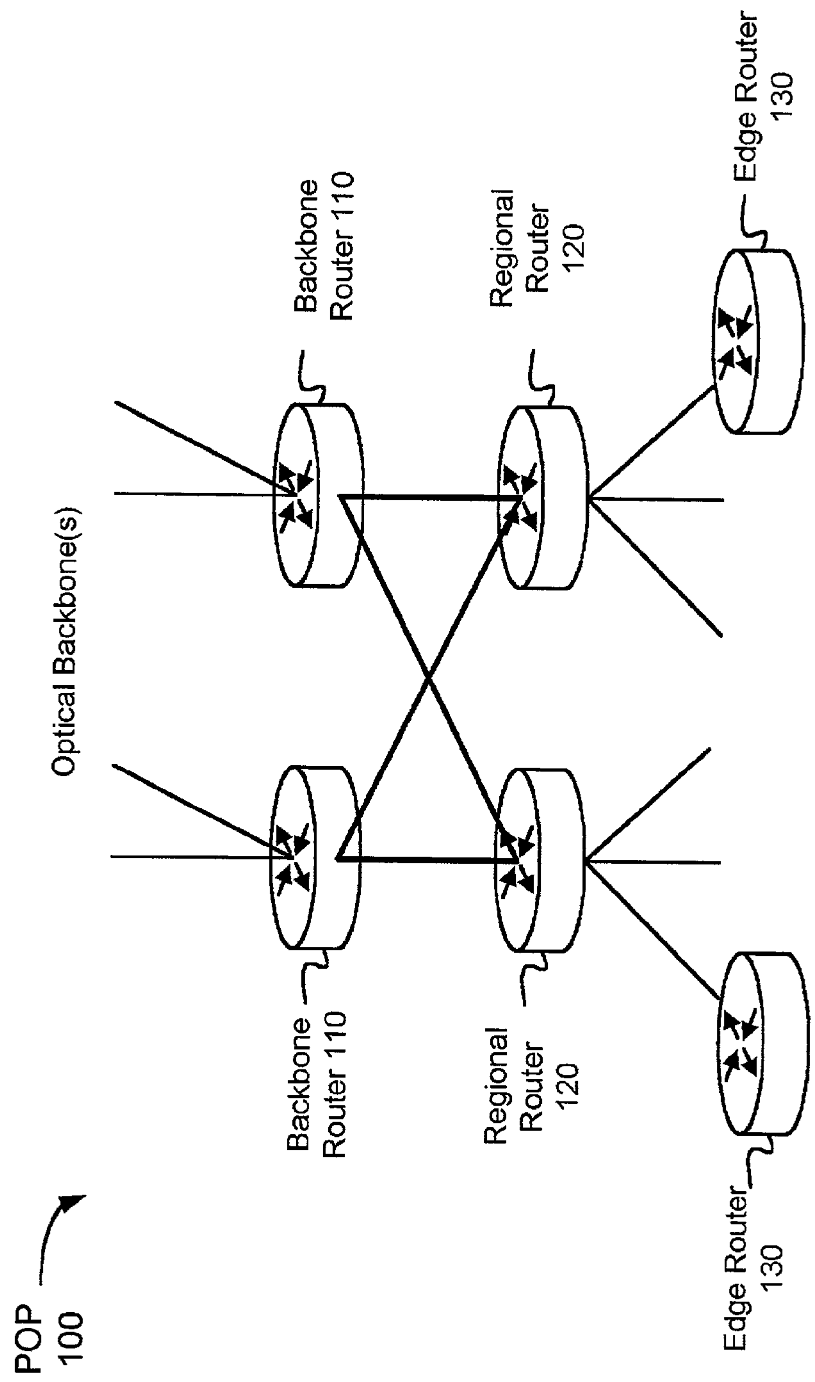
FIG. 1 is a diagram illustrating the inter-connection of a number of routers in a network.
Figure 3:
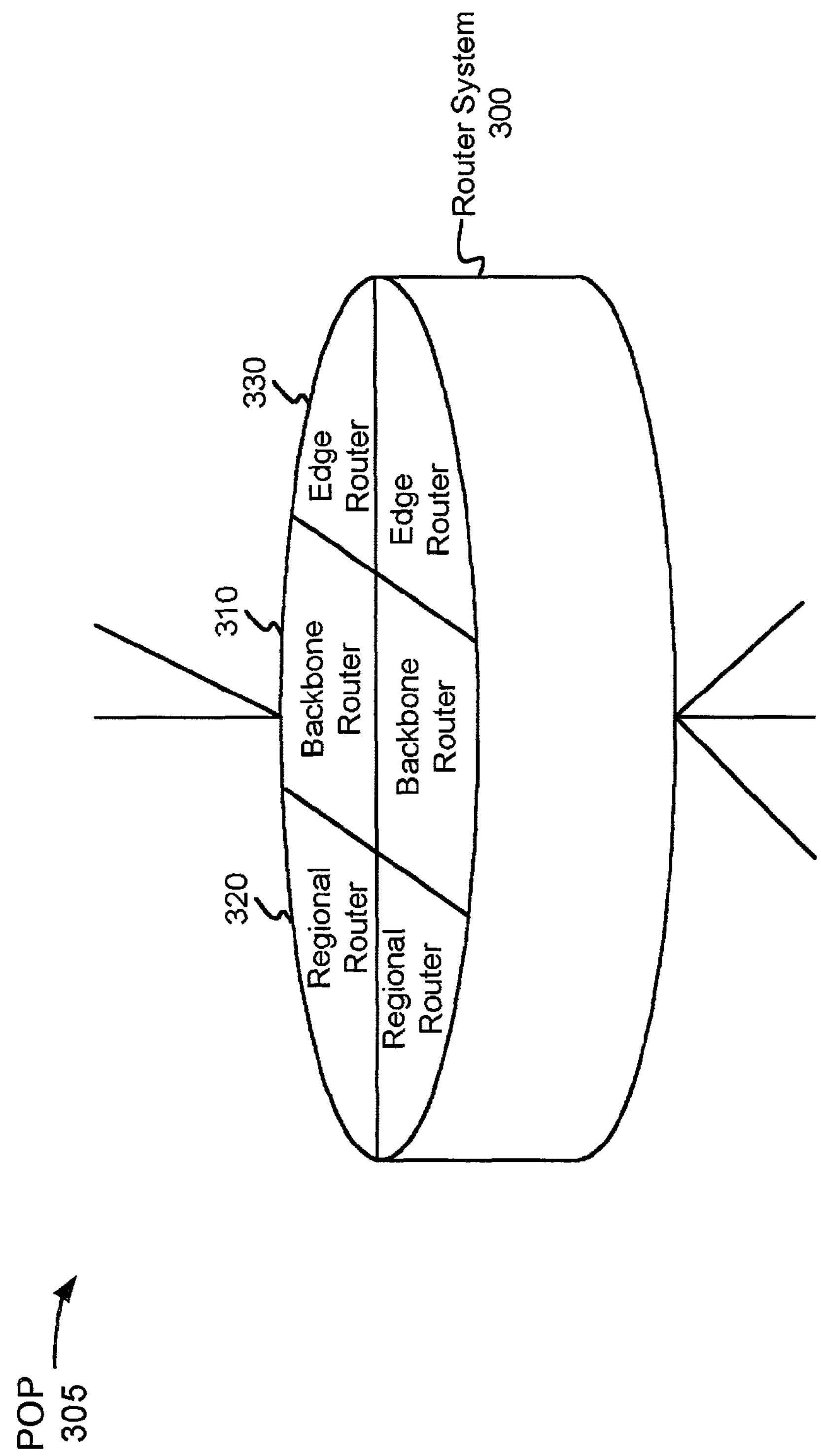
FIG. 3 is a diagram illustrating an arrangement of virtual routers in an implementation consistent with the present invention.

FIG. 3 is a diagram illustrating an exemplary router system 300 that includes six logically separated functional (virtual) routers in a POP 305. The virtual routers include backbone routers 310, regional routers 320, and edge routers 330. Functionally, routers 310, 320, and 330 operate as independent routers. Thus, from the point of view of an entity outside of POP 305, the routers 310, 320, and 330 may appear equivalent to the routers 110, 120, and 130 (FIG. 1). However, because these virtual routers are implemented within a single router system, resources of router system 300 may be allocated to multiple virtual routers.

Although router system 300 is shown as a single physical router system, in other implementations, multiple physical routers may together implement a number of virtual routers. For example, two physical routers, each implementing three virtual routers and communicating with the other physical router through traditional router ports, may be used instead of the single router.

Figure 4:
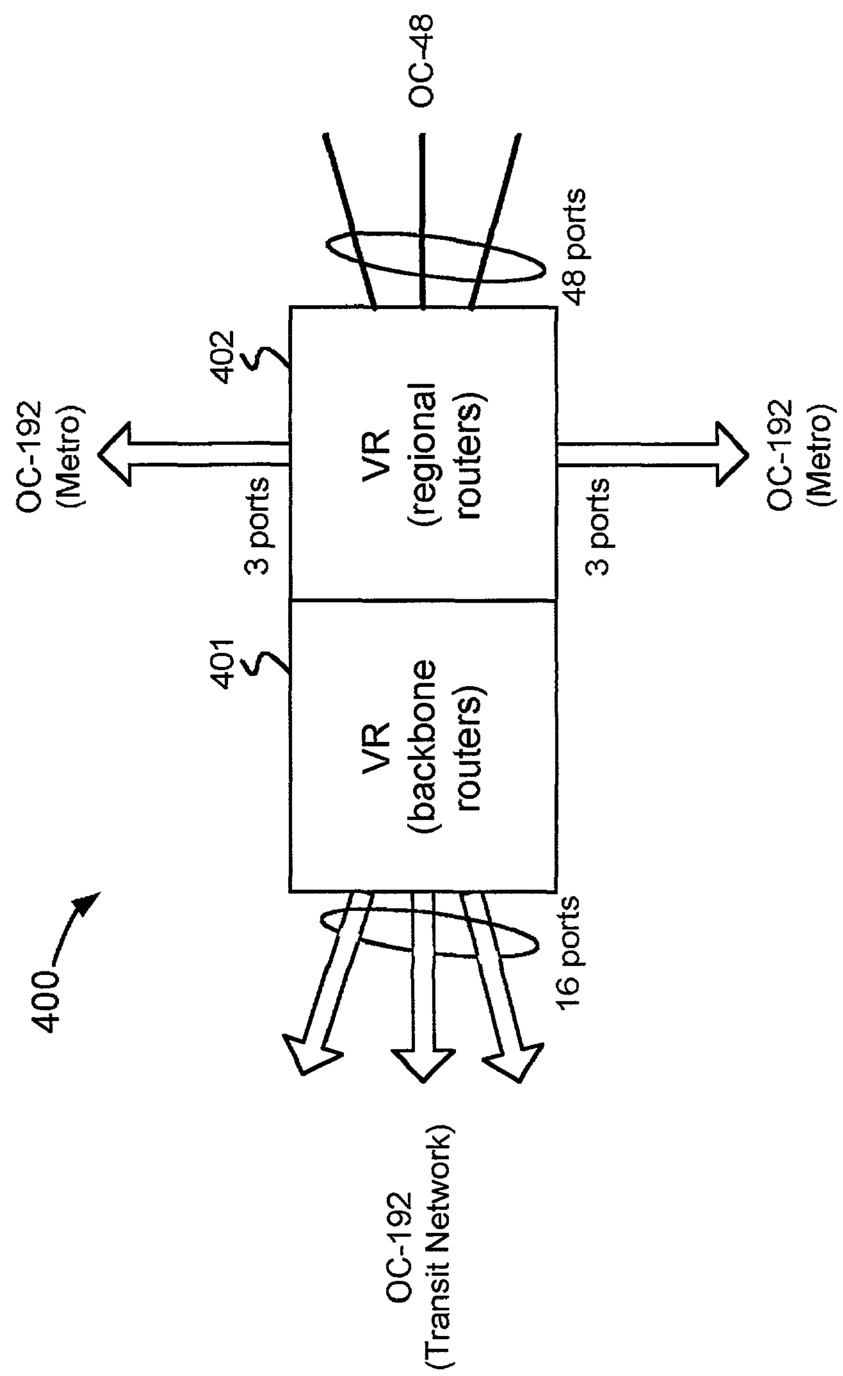
FIG. 4 is a diagram illustrating a second arrangement of virtual routers in an implementation consistent with the present invention.

FIG. 4 is a diagram illustrating another exemplary router system 400 that includes virtual routers (VRs). In FIG. 4, router system 400 implements two virtual routers. VR 401 performs the functionality of backbone routers 310 and VR 402 performs the functionality of regional routers 320.

A number of output ports are shown associated with router system 400. As shown, 16 OC-192 ports connect VR 401 to a transmit network, such as backbone links in the Internet. Six OC-192 ports connect VR 402 to metropolitan area networks, and 48 OC-48 ports connect VR 402 to edge routers. The OC port speed refers to the well known synchronous optical network (SONET) transmission standard. OC-192 transmits at 10 Gbps and OC-48 transmits at 2.488 Gbps.

ROUTER SYSTEM

Figure 5:
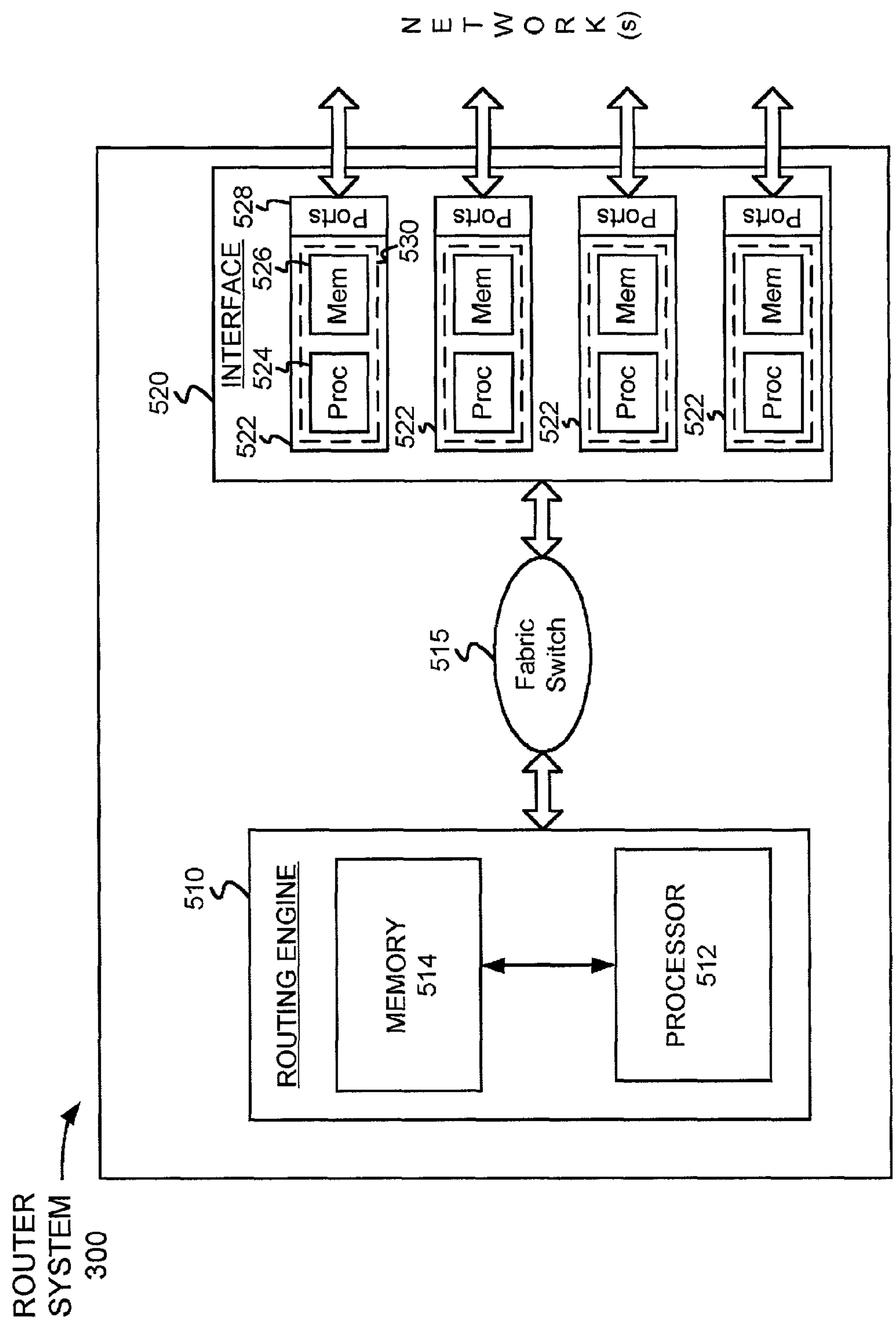
FIG. 5 illustrates an exemplary functional block diagram of the router system of FIGS. 3 and 4 in an implementation consistent with the present invention.

FIG. 5 is a block diagram illustrating a high-level layout of router system 300 (or router system 400). Router system 300 includes a routing engine 510, a fabric switch 515, and an interface 520.

Routing engine 510 includes memory 514 and processor 512. Processor 512 implements routing protocols (also called routing processes herein) that examine received network topology information and, based on the topology information, creates routing tables that reflect the topology of the network. Routing engine 510 may also generate forwarding tables based on the routing tables. The forwarding tables are transmitted to interface 520.

The memory 514 may include any type of conventional storage device. The memory 514 stores instructions and information that aids in the routing of packets in the network. The memory 514 may include one or more conventional databases. The memory 514 may also store one or more routing tables that allow for routing of received packets.

Fabric switch 515 provides a communication fabric between routing engine 510 and interface 520.

Interface 520 includes a number of line cards 522. Line cards 522 receive data at corresponding ports 528 from physical links connected to a network(s). Each physical link could be one of many types of transport media, such as optical fiber or Ethemet cable. Each line card may include a line card processor 524 and a line card memory 526. The line card processor 524 and memory 526 may be used to implement forwarding engine 530 for the line card 522. In general, forwarding engine 530 directs and transmits incoming and outgoing packets in interface 520. Memory 526 may store the forwarding tables transmitted from routing engine 510 over fabric switch 515. Line card processor 524 uses its forwarding table, stored in memory 526, when transmitting packets to fabric switch 515 and the external network(s).

Although processors 512 and 524 are illustrated in FIG. 5 as general purpose processors, the functionality implemented by processors 512 and 524 may be implemented in application-specific integrated circuits (ASICs). The ASICs may be configured to perform some processing via dedicated logic, and may also be configured to perform some processing using microcode instructions that may be stored in memory. Those skilled in the router art will appreciate that router system 300 might be practiced using a variety of hardware configurations in addition to, or instead of, ASICs.

ROUTER SYSTEM RESOURCE SHARING

As previously mentioned, router systems 300 or 400 may share resources among the virtual routers of the router systems. The term “resources,” as used herein, may refer to either logical or physical capabilities of the router system. Two logical resources will be considered: (a) routing processes and (b) forwarding processes. Additionally, two physical resources will be considered: (a) control resources and (b) data resources.

Routing processes refer to methods implemented by the router system in determining routing information for received packets. A routing process can include building routing tables and forwarding tables based on network topology information and based on the routing protocols being used.

Forwarding processes refer to methods implemented by the router system in actually forwarding the received packets to the appropriate destinations. These methods include examining packet headers and applying forwarding tables to the packet headers to appropriately construct the packet that is to be transmitted.

Building routing and forwarding tables within a router, and using these table to appropriately route packets is generally well known in the art. Accordingly, further details of the routing and forwarding protocols will not be given herein.

The control resources refer to the physical incarnations of the routing and forwarding processes, such as the actual routing and forwarding table memories. The data resources, on the other hand, refer to physical specifications of the router system such as the number of ports, the port bandwidth, and the bandwidth of an internal fabric switch of the router system.

Router system 300 or 400, when implementing virtual routers, may implement the virtual routers by sharing resources across multiple virtual routers. By sharing resources, the router system 300 or 400 may more efficiently implement multiple virtual routers.

Various combinations of shared and non-shared resources may be implemented by router system 300 or 400. Possible combinations are shown in Table 1, below. In Table 1, RP stands for routing processes, FP stands for forwarding processes, CR stands for control resources, and DR stands for data resources.

TABLE 1

| | RP (separate), FP (separate), | RP (separate), FP (shared) | RP (shared), FP (separate) | RP (shared), FP (shared) |
|---|---|---|---|---|
| CR(separate), DR(separate) | State 1 | State 2 | State 3 | State 4 |
| CR(shared), DR(separate) | State 5 | State 6 | State 7 | State 8 |
| CR(separate), DR(shared) | State 9 | State 10 | State 11 | State 12 |
| CR(shared), DR(shared) | State 13 | State 14 | State 15 | State 16 |

Figure 6:
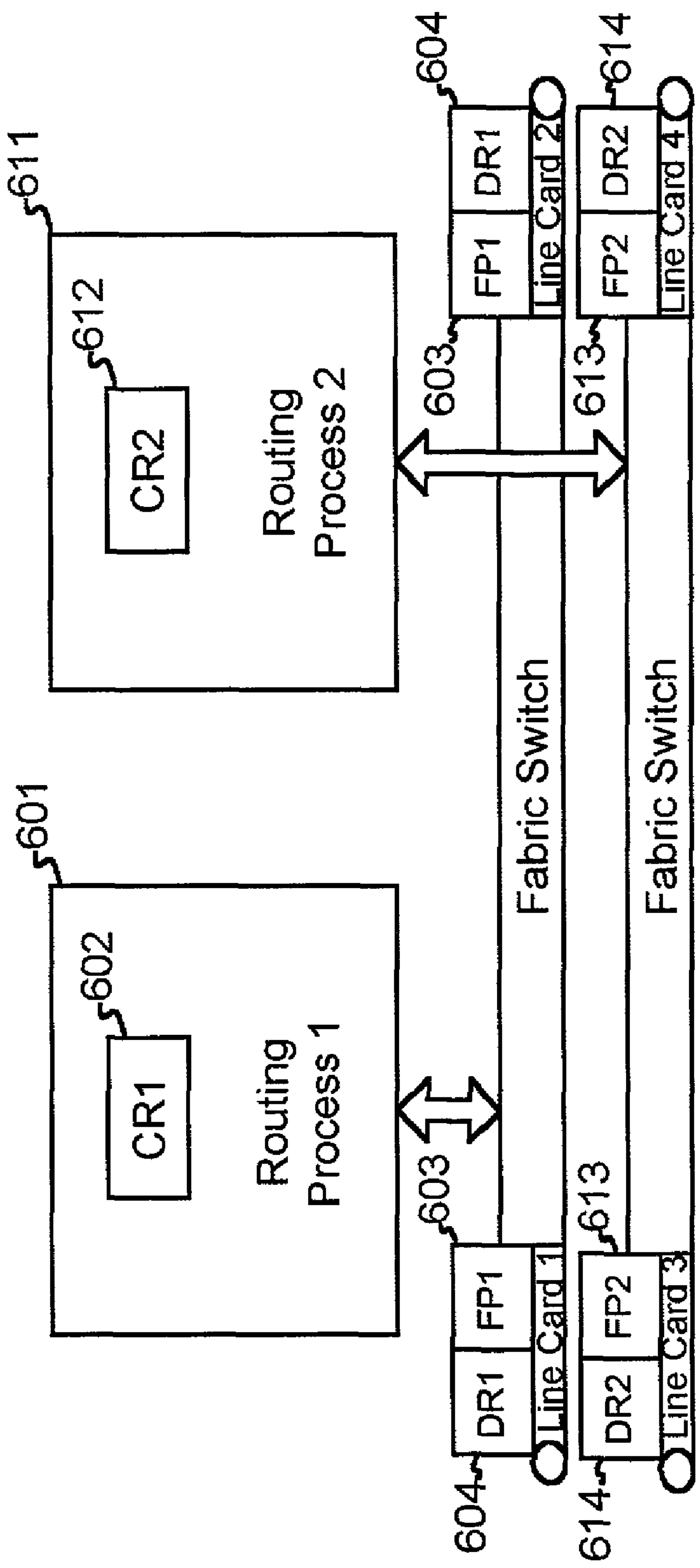
FIGS. 6-15 are diagrams illustrating resource allocations for various virtual router configurations.

FIG. 6 is a diagram conceptually illustrating resource allocation for virtual routers in which the router system allocates separate control resources, separate data resources, separate routing processes, and separate forwarding processes (state 1 in Table 1). Two exemplary virtual routers are shown in FIG. 6. The first virtual router includes a routing process 601 and control resources 602 (referred to collectively as the first virtual router's control plane). The control plane of the second virtual router includes a routing process 611 and corresponding control resources 612. The first virtual router additionally includes forwarding process 603 and data resources 604 (referred to collectively as the first virtual router's data plane). The data plane of the second virtual router includes forwarding process 613 and data resources 614. The data resources 604 and 614 may include, for example, the various port (interface) bandwidths and the switching fabric bandwidth.

In the scenario of FIG. 6, each virtual router acts as a standalone router because each router has a separate control and data plane. This can be advantageous, as it allows the virtual routers to share the same management plane and at the same time, due to the independence of the virtual routers, allows for a relatively high level of security.

Figure 7:
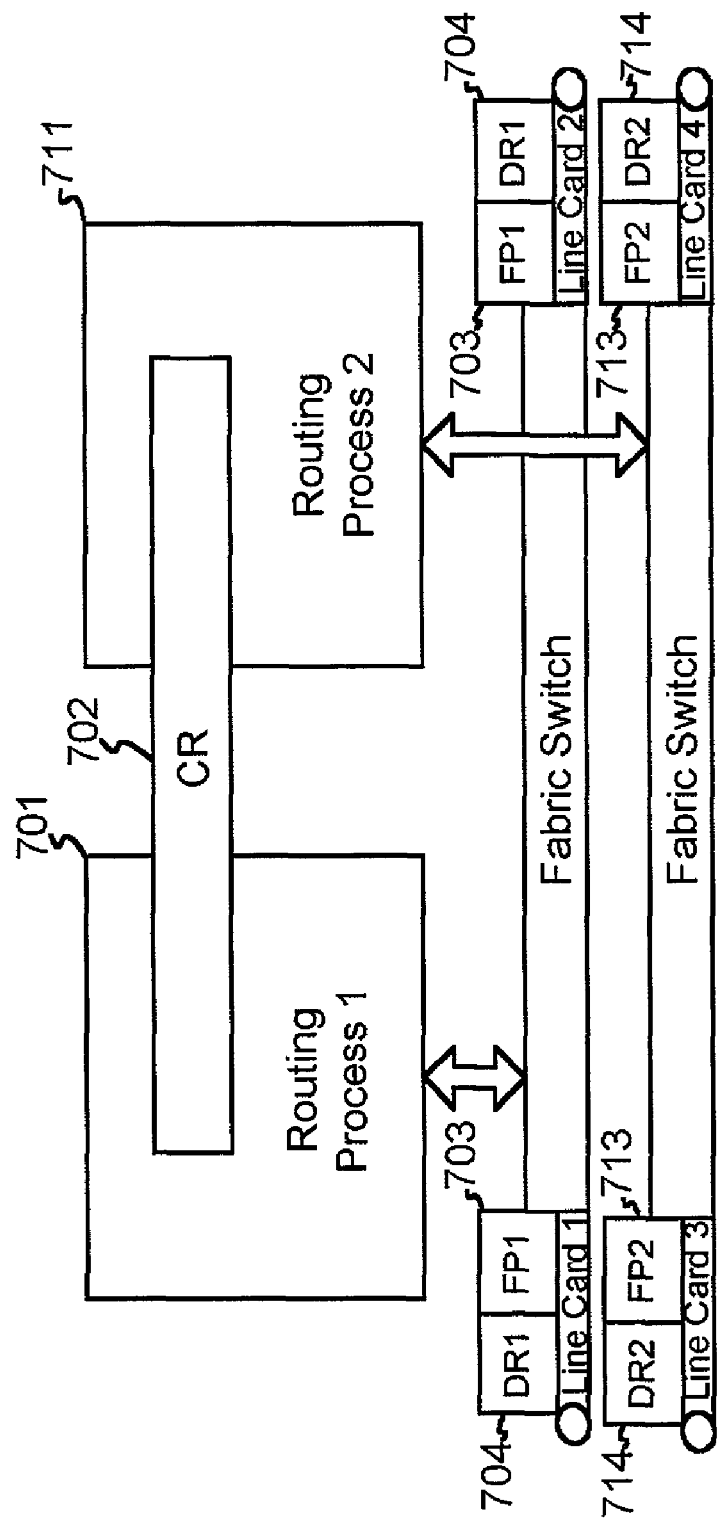

FIG. 7 is a diagram conceptually illustrating resource allocation for virtual routers in which the routing system allocates shared control resources, separate data resources, separate routing processes, and separate forwarding processes (state 5 in Table 1). As shown, two virtual routers share control resources 702. The virtual routers include separate routing processes 701 and 711. Additionally, the virtual routers include separate data planes. That is, the first virtual router includes forwarding process 703 and data resources 704, and the second virtual router includes forwarding process 713 and data resources 714.

The control resources, as previously mentioned, can include a routing table memory and/or forwarding table memories. Accordingly, in one implementation, the virtual routers in FIG. 7 may share a single routing table memory. The virtual routers may also share forwarding table memories. Typically, forwarding table memories are included in the line cards associated with each port of a router. Accordingly, it may be desirable to not share forwarding table memories between virtual routers having separate data planes.

Figure 8:
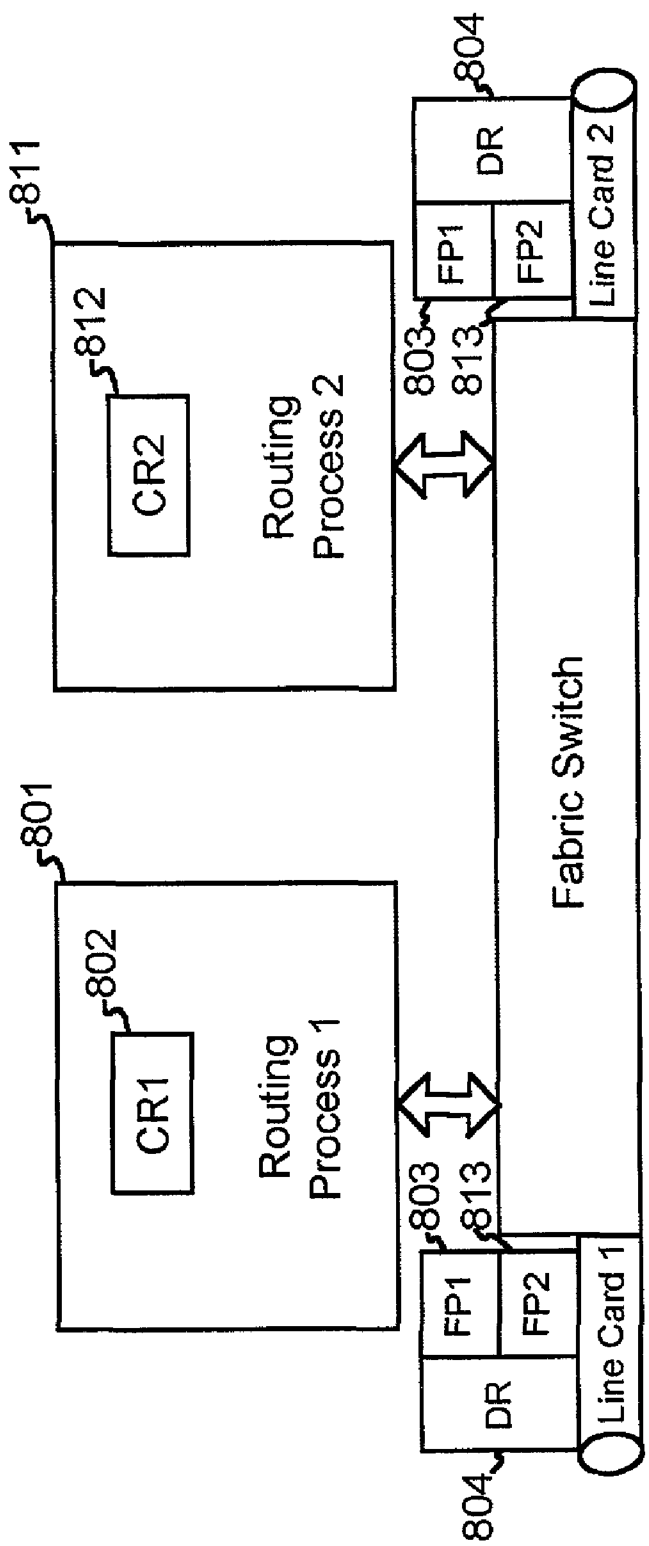

FIG. 8 is a diagram conceptually illustrating resource allocation for virtual routers in which the router system allocates separate control resources, shared data resources, separate routing processes, and separate forwarding processes (state 9 in Table 1). The two virtual routers shown in FIG. 8 share a single data resource 804, which may include the fabric switch and/or the router ports. Further, the first virtual router includes routing processes 801, control resources 802, and forwarding processes 803. The second virtual router includes routing processes 811, control resources 812, and forwarding processes 813.

Figure 9:
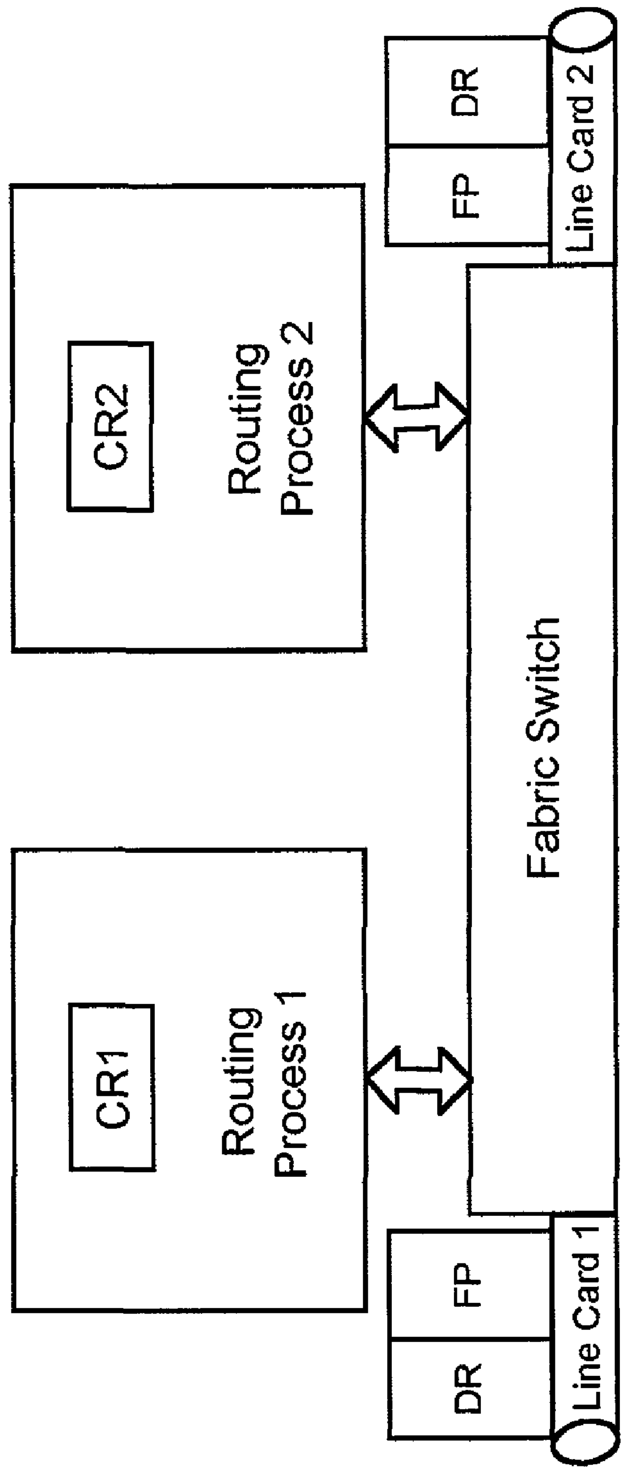

FIG. 9 is a diagram conceptually illustrating resource allocation for virtual routers in which the router system allocates separate control resources, shared data resources, separate routing processes, and shared forwarding processes (state 10 in Table 1). This embodiment of the virtual routers is similar to that shown in FIG. 8, except that the forwarding processes are also shared.

Figure 10:
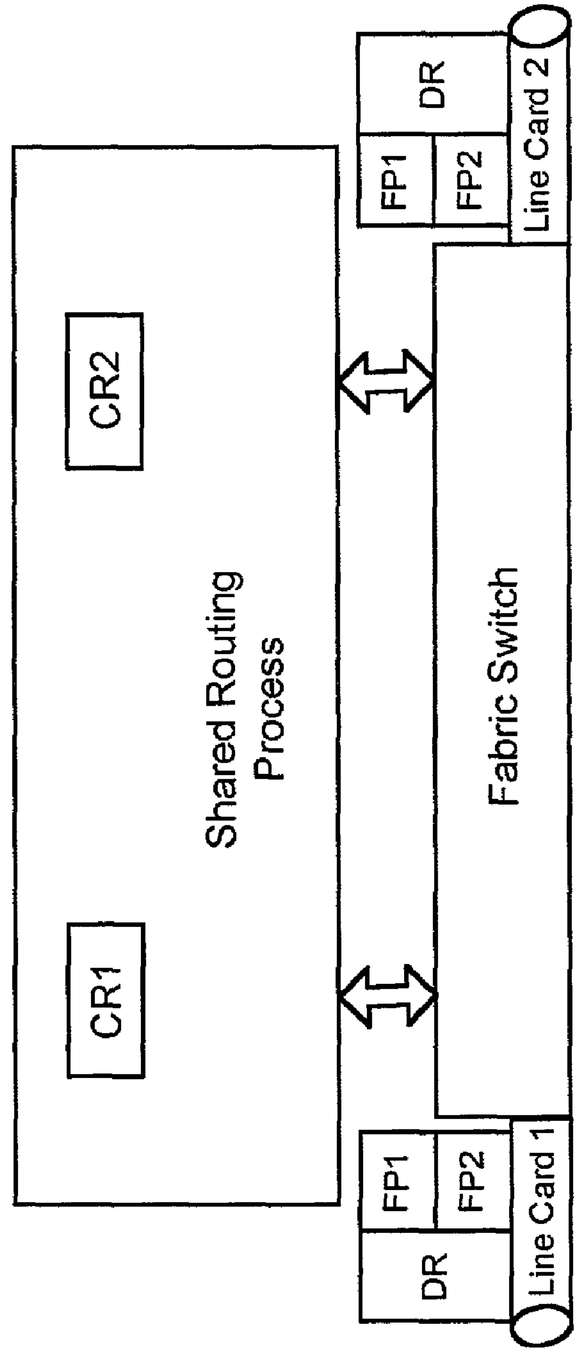

FIG. 10 is a diagram conceptually illustrating resource allocation for virtual routers in which the router system allocates separate control resources, shared data resources, shared routing processes, and separate forwarding processes (state 11 in Table 1). This embodiment of the virtual routers is similar to that shown in FIG. 8, except that the routing processes are also shared.

Figure 11:
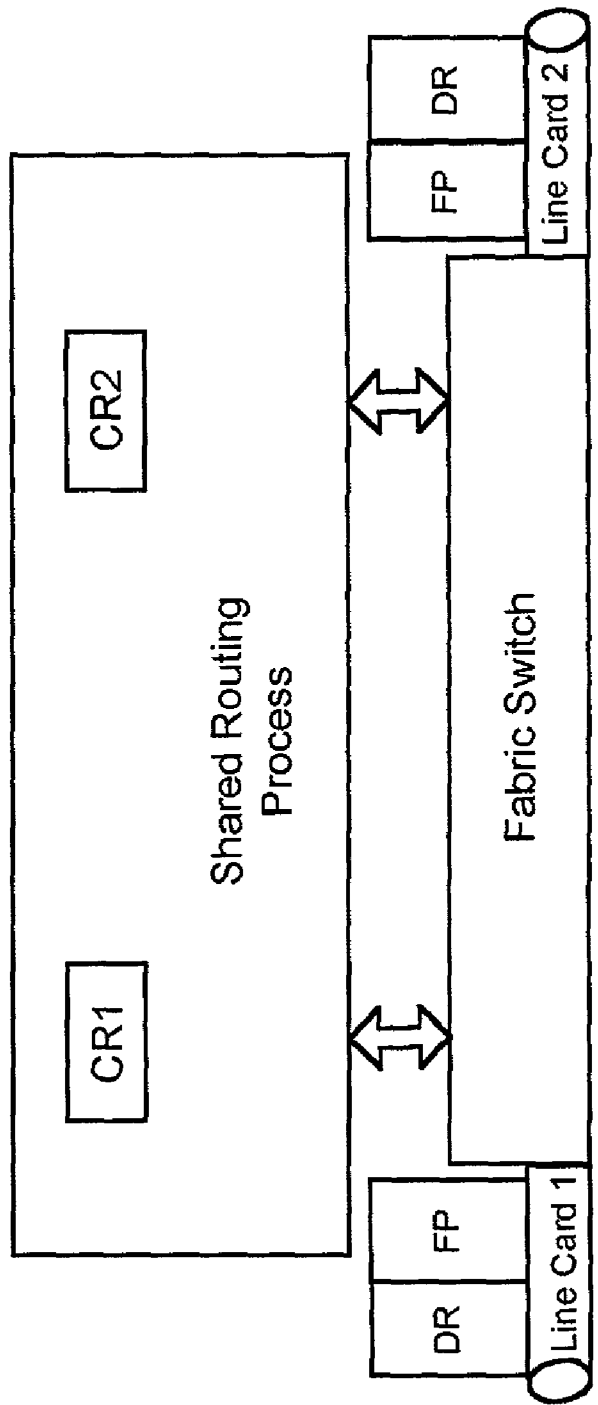

FIG. 11 is a diagram conceptually illustrating resource allocation for virtual routers in which the router system allocates separate control resources, shared data resources, shared routing processes, and shared forwarding processes (state 12 in Table 1). This embodiment of the virtual routers is similar to that shown in FIG. 8, except that the routing processes and forwarding processes are shared.

Figure 12:
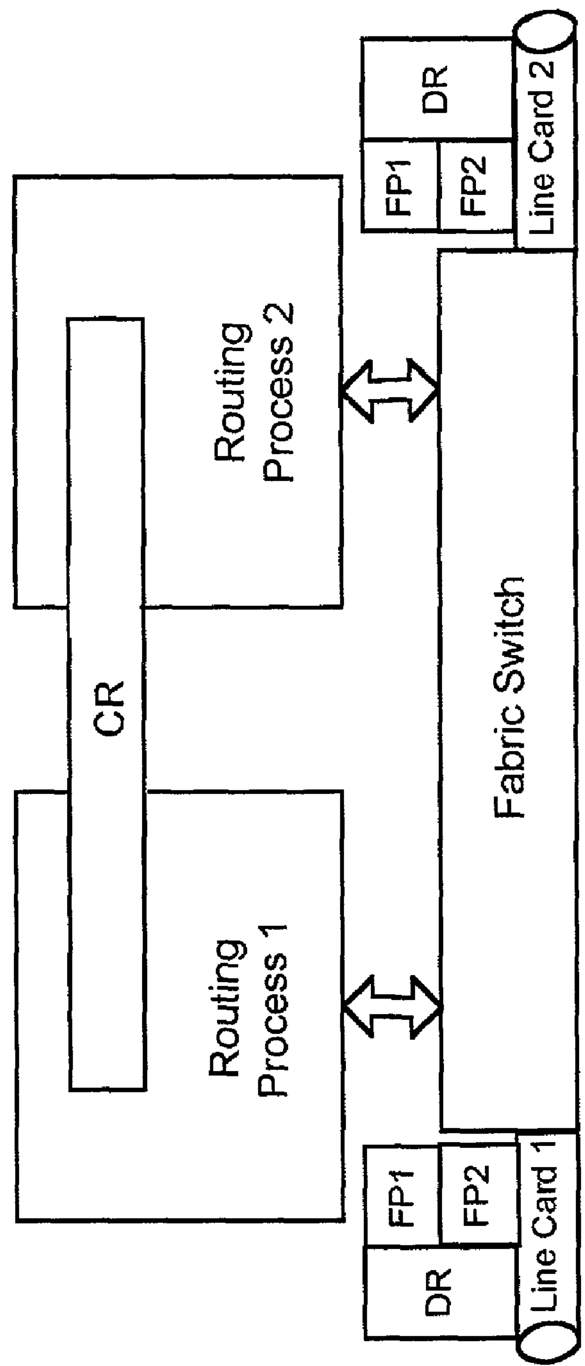

FIG. 12 is a diagram conceptually illustrating resource allocation for virtual routers in which the router system allocates shared control resources, shared data resources, separate routing processes, and separate forwarding processes (state 13 in Table 1). The data resources that are shared may include sharing of the fabric switch, sharing of the port bandwidth, or sharing of both the fabric switch and the port bandwidth. The control resources that are shared may include sharing of the routing table memory, sharing of forwarding table memories, or sharing of both the routing and forwarding table memories.

Figure 13:
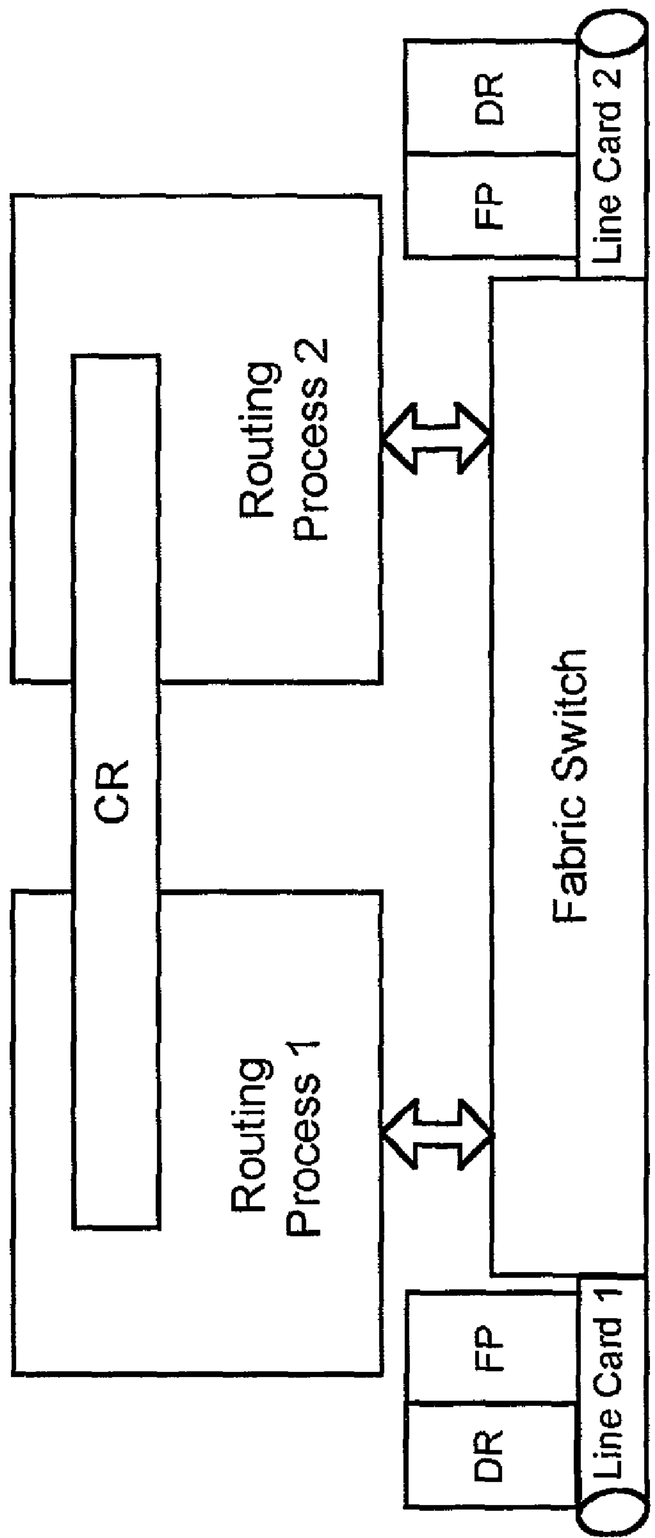

FIG. 13 is a diagram conceptually illustrating resource allocation for virtual routers in which the router system allocates shared control resources, shared data resources, separate routing processes, and shared forwarding processes (state 14 in Table 1). This embodiment of the virtual routers is similar to that shown in FIG. 12, except that the virtual routers additionally share a forwarding process.

Figure 14:
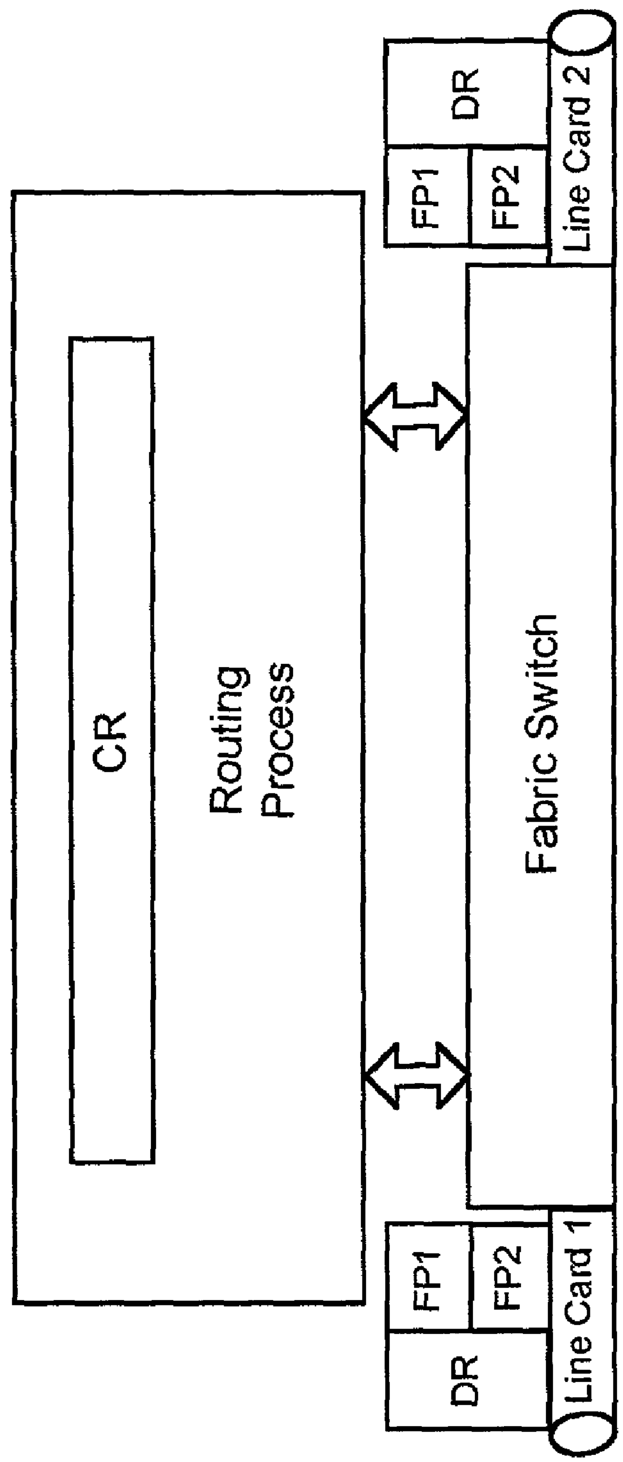

FIG. 14 is a diagram conceptually illustrating resource allocation for virtual routers in which the router system allocates shared control resources, shared data resources, shared routing processes, and separate forwarding processes (state 15 in Table 1). This embodiment of the virtual routers is similar to that shown in FIG. 8, except that the virtual routers additionally share a routing process.

Figure 15:
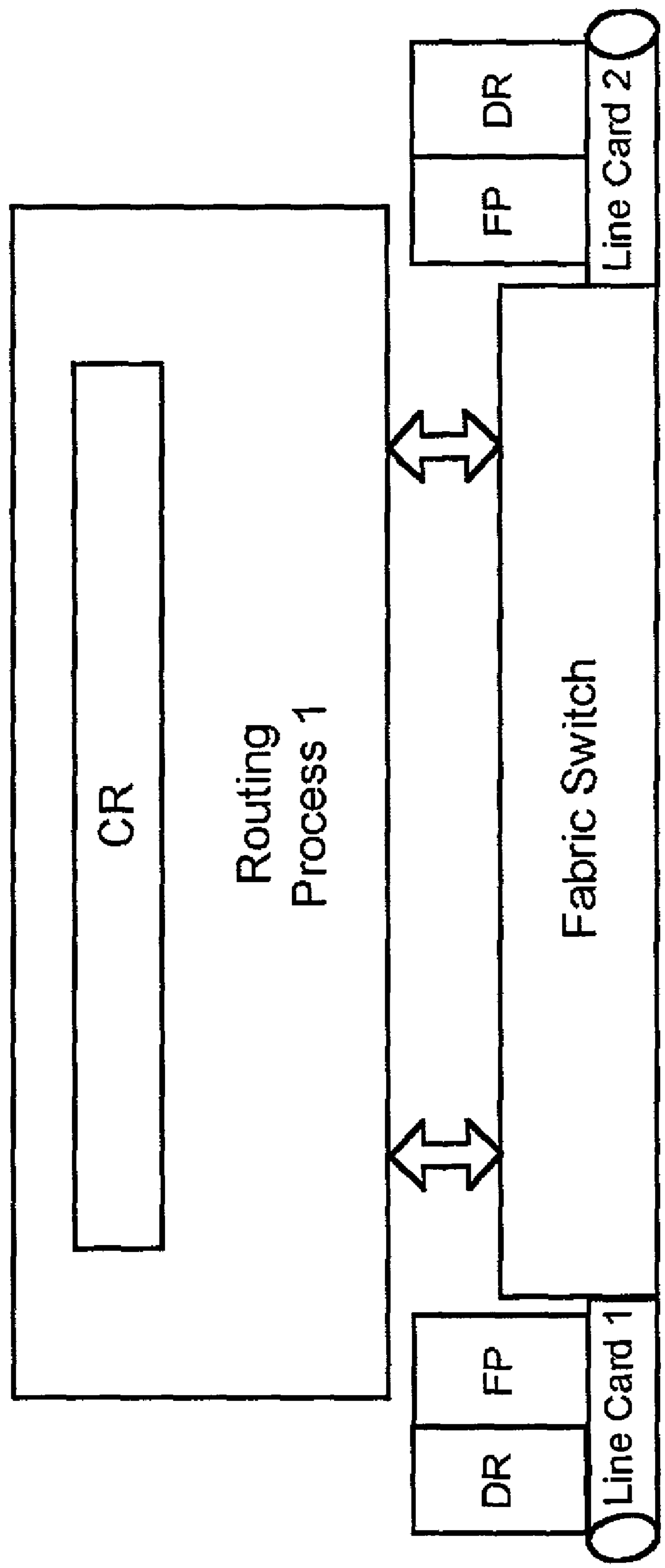

FIG. 15 is a diagram conceptually illustrating resource allocation for virtual routers in which the routing system allocates shared control resources, shared data resources, shared routing processes, and shared forwarding processes (state 16 in Table 1). This embodiment of the virtual routers is similar to that shown in FIG. 8, except that the virtual routers additionally share a routing process and a forwarding process.

A number of possible resource sharing configurations have been described above in reference to FIGS. 6-15. Router system 300/400 may use these various resource sharing configurations to implement collections of virtual routers, such as the virtual router shown in FIGS. 3 and 4. In one embodiment, router system 300/400 may be programmably modified by a user to implement different ones of the resource sharing configurations shown in FIGS. 6-15.

Specific hardware implementations of virtual routers are discussed in copending, commonly assigned U.S. patent application Ser. No. 10/085,031, filed Mar. 1, 2003 and entitled, "Systems And Methods For Implementing a Virtual Router," the contents of which are incorporated in their entirety herein.

Virtual router configurations corresponding to a number of the states shown in Table 1 have been discussed in detail. One of ordinary skill in the art will recognize, however, that virtual routers having configurations shown in Table 1 but not explicitly discussed above could also be implemented.

CONCLUSION

Systems and methods, consistent with the present invention, provide a routing system that implements virtual routers. The virtual routers of the routing system functionally act, from the standpoint of an external device, as independent routers. The routing system may share resources in implementing the virtual routers. The configuration of the shared resources may be user programmable.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

It will be appreciated that the present invention can be implemented in hardware, software, or a combination of hardware and software. Thus, the present invention is not limited to any specific combination of hardware circuitry and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A device-implemented routing system comprising:

a plurality of device-implemented routing resources, including:

device-implemented logic resources including routing processes to determine routing for received packets and forwarding processes to forward the received packets to an appropriate destination; and device-implemented physical resources comprising control resources and data resources, the control resources including at least one routing table and the data resources including physical specifications of the routing system; and a plurality of device-implemented virtual routers to reconfigurably share the device-implemented routing resources, among the device-implemented virtual routers, in accordance with a plurality of programmably modifiable resource sharing configurations to be reconfigurably modified by a user, in order to implement different device-implemented virtual router configurations based on different sets of network requirements, where the programmably modifiable resource sharing configurations specify which of the routing processes, the forwarding processes, the control resources, and the data resources are to be shared between the plurality of device-implemented virtual routers and specify which of the routing processes, the forwarding processes, the control resources, and the data resources are not to be shared between the plurality of device-implemented virtual routers.

2. A network point-of-presence (POP) comprising:

a single physical router having a plurality of resources, including logic resources, including routing processes to determine routing for received packets and forwarding processes to forward the received packets to an appropriate destination; and physical resources comprising control resources and data resources, the control resources including at least one routing table and the data resources including physical specifications of the single physical router;

at least one backbone router, having a routing capacity, implemented, at an end-point of a high capacity network link, as a virtual router by the single physical router; and at least one regional router implemented as a virtual router by the single physical router, where the backbone virtual router and the regional virtual router reconfigurably share resources, of the single physical router, based on a plurality of resource sharing configurations and an input by a user, in order to implement different device-implemented virtual router resource sharing configurations based on different sets of network requirements, where the resource sharing configurations, in conjunction with the input by a user, specify which of the routing processes, the forwarding processes, the control resources, and the data resources are to be shared between the backbone virtual router and the regional virtual router routers and specify which of the routing processes, the forwarding processes, the control resources, and the data resources are to be separately implemented by the backbone virtual router and by the regional virtual router.

3. The network POP of claim 2, further comprising:

ports connecting the backbone virtual router to a high capacity transit network; and ports connecting the regional router to a metropolitan area network.

4. A method, performed by a single device in a network, comprising:

allocating a first set of resources as shared resources;

allocating a second set of resources as non-shared resources, where the allocating the first set of resources and the allocating the second set of resources include:

allocating logic resources, including routing processes to determine routing for received packets and forwarding processes to forward the received packets to an appropriate destination; and allocating physical resources comprising control resources and data resources, the control resources including at least one routing table and the data resources including physical specifications of the single device; and implementing a plurality of virtual routers based on a reconfigurable sharing of resources, from the first set of resources, between the virtual routers and based on reconfigurably and independently assigning resources of the second set of resources between each of the virtual routers, where the resources included in the first set of resources and the resources included in the second set of resources may be reconfigurably modified by a user, in order to implement different device-implemented virtual router configurations based on different sets of network requirements, where the device-implemented virtual router configurations identify which of the routing processes, the forwarding processes, the control resources, and the data resources are to be shared between the plurality of virtual routers and identify which of the routing processes, the forwarding processes, the control resources, and the data resources are to be separately implemented by the virtual routers.

5. A device-implemented router comprising:

a device-implemented means for performing routing processes to determine routing for received packets;

a device-implemented means for performing forwarding processes to forward the received packets to an appropriate destination;

a device-implemented means for implementing control resources;

a device-implemented means for implementing data resources, including physical specifications of the device-implemented router; and a device-implemented means for implementing a plurality of virtual routers that share ones of the device-implemented means for performing routing processes, the device-implemented means for performing forwarding processes, the device-implemented means for implementing control resources, and the device-implemented means for implementing data resources, based on a plurality of programmably modifiable resource sharing configurations that are programmably modifiable by a user to share resources between the plurality of virtual routers, in order to implement different device-implemented virtual router configurations based on different sets of network requirements, where the programmably modifiable resource sharing configurations specify which of the device-implemented means for performing routing processes, the device-implemented means for performing forwarding processes, the device-implemented means for implementing control resources, and the device-implemented means for implementing data resources are to be shared between the plurality of virtual routers and specify which of the device-implemented means for performing routing processes, the device-implemented means for performing forwarding processes, the device-implemented means for implementing control resources, and the device-implemented means for implementing data resources are not to be shared between the plurality of virtual routers.

6. The routing system of claim 5, where the means for performing routing processes includes means for building routing tables and forwarding tables based on network topology.

7. The routing system of claim 6, where the means for performing forwarding processes includes means for comparing information in packet headers to the forwarding tables.

8. The routing system of claim 6, where the means for implementing control resources includes means for storing the routing and forwarding processes.

9. A method, performed by a single router in a network, comprising:

allocating a set of routing resources as shared resources, where the allocating the set of resources includes:

allocating logic resources, including routing processes to determine routing for received packets and forwarding processes to forward the received packets to an appropriate destination; and allocating physical resources comprising control resources and data resources, the control resources including at least one routing table and the data resources including physical specifications of the single router;

selecting, by a user, a first desired resource sharing configuration, based on a first set of network requirements, to be implemented by a plurality of virtual routers, from a plurality of routing resource sharing configurations, the plurality of routing resource sharing configurations including:

a first configuration, where the plurality of virtual routers do not share resources;

a second configuration, where the plurality of virtual routers only share control resources;

a third configuration, where the plurality of virtual routers only share data resources;

a fourth configuration, where the plurality of virtual routers only share data resources and forwarding processes;

a fifth configuration, where the plurality of virtual routers only share data resources and routing processes;

a sixth configuration, where the plurality of virtual routers only share data resources, forwarding processes and routing processes;

a seventh configuration, where the plurality of virtual routers only share data resources and control resources;

an eight configuration, where the plurality of virtual routers only share data resources, forwarding processes and control resources;

a ninth configuration, where the plurality of virtual routers only share data resources, routing processes and control resources; and a tenth configuration, where the plurality of virtual routers share data resources, routing processes, forwarding processes and control resources;

implementing the plurality of virtual routers based on the first desired resource sharing configuration;

implementing a second desired resource sharing configuration, different than the first desired resource sharing configuration, based on a second set of network requirements, different than the first set of network requirements.

* * * * *